Sept. 5, 1950 O. KORNEI 2,521,635

IMAGE RETAINING SYSTEM

Filed Nov. 8, 1945 3 Sheets-Sheet 1

INVENTOR.
OTTO KORNEI
BY [signature]

ATTORNEY

Sept. 5, 1950 O. KORNEI 2,521,635
IMAGE RETAINING SYSTEM
Filed Nov. 8, 1945 3 Sheets-Sheet 2
Fig. 1-A
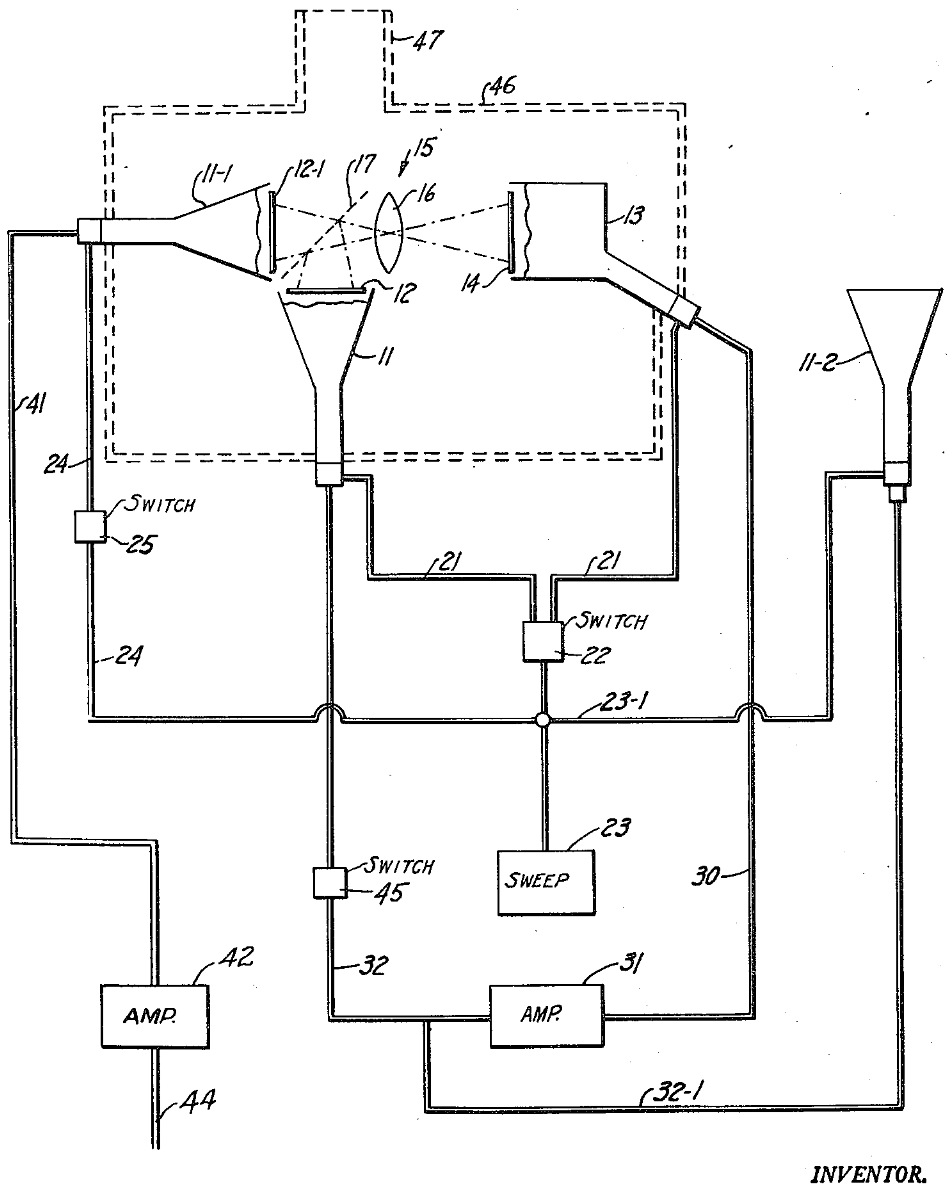
INVENTOR.
OTTO KORNEI
BY [signature]
ATTORNEY INVENTOR.
OTTO KORNEI
BY [signature]
ATTORNEY Patented Sept. 5, 1950

2,521,635

UNITED STATES PATENT OFFICE 2,521,635

IMAGE RETAINING SYSTEM

Otto Kornei, Cleveland Heights, Ohio, assignor to The Brush Development Company, Cleveland, Ohio, a corporation of Ohio Application November 8, 1945, Serial No. 627,503

5 Claims. (Cl. 171—95)

This invention relates to image retaining systems and more particularly to systems and methods for providing a persistent or enduring image of a nonrecurrent momentary image representative of an event which is to be analyzed and observed.

Among the objects of the invention is a novel image retaining system and method utilizing a feed back system including image translating means which translate a momentary irregularly shaped image projected thereon into a sequence of corresponding electric image reproducing signals with electroresponsive image reproducing means arranged to be actuated by a sequence of image reproducing signals for producing a corresponding momentary image and image projecting means which project the momentary image produced by the image reproducing means on an image translating element of the image translating means; the feed back system operating so as to feed back successive sequences of the image reproducing signals from the image translating means to the image reproducing means and cause it to reproduce a succession of corresponding momentary images which serve effectively and may be observed as a substantially persistent enduring image of the momentary image.

A more particular object of the invention is a transient analyzer utilizing an image retaining system of the foregoing type for retaining during a desired length of time an image of a momentary transient event so that the characteristics of the event may be studied from the persistent image representing the characteristics of the transient event.

The foregoing and other objects of the invention will be best understood from the following description of exemplifications thereof, reference being had to the accompanying drawings wherein Fig. 1—A is a diagrammatic block-type illustration of a photo-electric image retaining feed back system exemplifying the invention;

Figure 1:
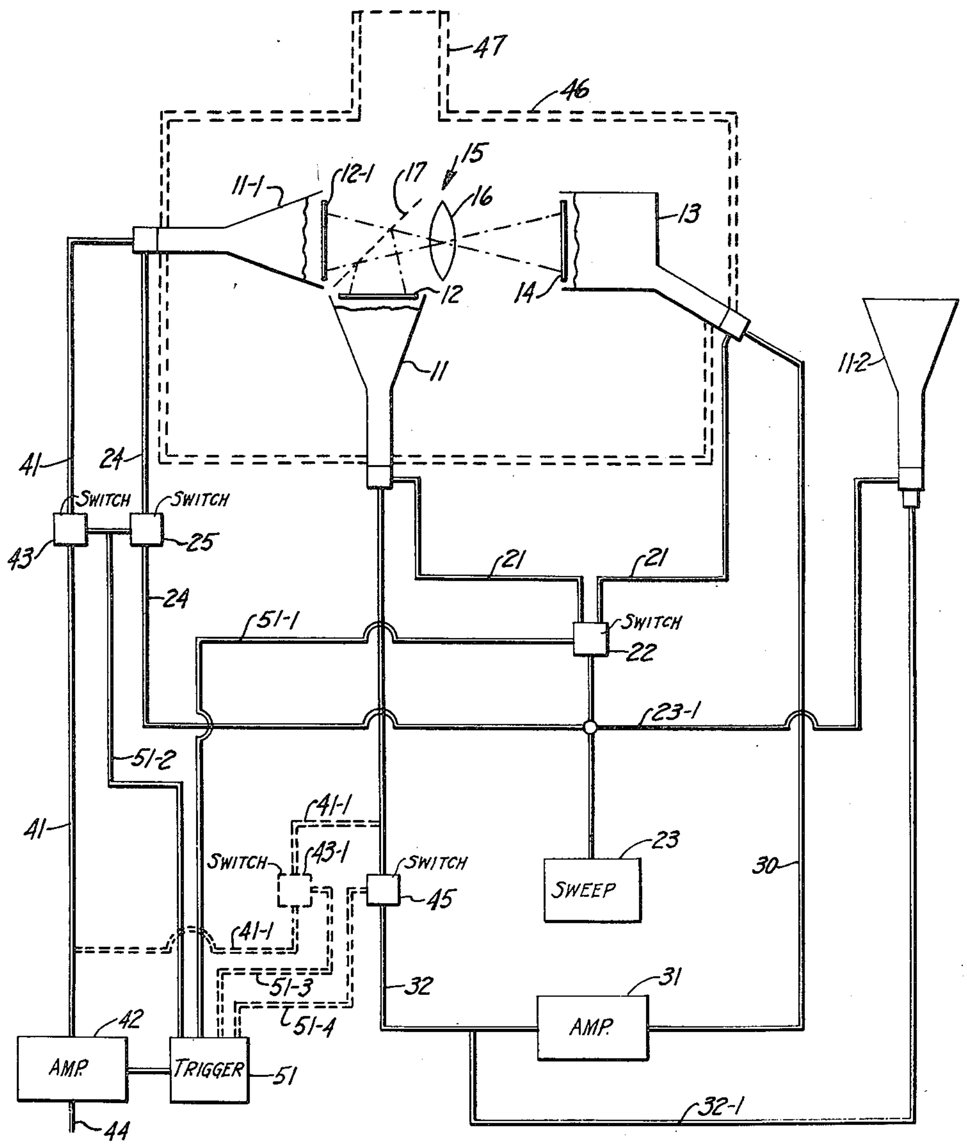
Fig. 1 is a diagrammatic block-type illustration of an automatically operating transient analyzer utilizing an image retaining system shown in Fig. 1—A.

Although the underlying principles have many other applications, the present invention has as its specific object a novel form of a transient analyzer. Prior practical transient analyzers are described in the Patent No. 2,378,388 of S. J. Begun, assigned to The Brush Development Company, in the article "A New Instrument for Recording Transient Phenomena," by S. J. Begun, published in the "Transactions of the American Institute of Electrical Engineers of 1941," and in the application Serial No. 576,386, filed February 6, 1945, by John P. Arndt, Jr., et al., and assigned to the assignee of the present application.

In the prior practical transient analyzer a cyclically operative endless magnetic recording medium is utilized for magnetically recording a signal sequence of irregularly different signal elements corresponding to a transient occurrence of irregular character and the recorded signal sequence is thereupon cyclically reproduced and impressed on a cyclically operative indicating device, such as an oscilloscope, for producing thereon a succession of corresponding irregularly shaped momentary images of the transient which may be observed as an enduring persistent image of the transient occurrence.

In such prior transient analyzers, an electronic trigger and switch control circuit is arranged to maintain the transient analyzer in a standby condition and to operate automatically upon occurrence of a transient and switch the transient analyzer from a standby condition to an initial operating condition during which a signal sequence corresponding to a record of the transient is captured or retained by recording it on the endless magnetic recording medium. Furthermore, the control circuit is arranged to operate automatically after a time delay correlated with the progress of the recording operation to switch the analyzer to the transient reproducing condition during which the cyclically reproduced record of the transient is cyclically impressed on a cathode ray oscilloscope for cyclically reproducing thereon a succession of momentary characteristic images of the transient which may be observed as an enduring persistent image of the transient.

In the transient analyzer based on the principles of the invention, a photo-electric feed back system is utilized to capture an initial irregularly shaped momentary image of the transient and to produce thereafter a succession of identical similar momentary images of the transient so that they may be observed as an enduring persistent irregularly shaped image of the transient. In the photo-electric image feed back system of the invention, the irregularly shaped momentary image of the transient is reproduced on the image screen of an image reproducing cathode ray tube and is projected therefrom by an optical projection system on a photo-electric image translating screen of an image transmitter tube. The image reproducing tube and the image transmitting tube are similar in their operation to standard television image reproducing tubes and television image transmitting tubes and are interconnected so that each momentary image projected on the image translating screen of the transmitter tube is translated thereby into a sequence of corresponding irregularly different electric image reproducing signals which are fed back and impressed on the image reproducing image receiving tube for reproducing an identical irregularly shaped momentary image which is again projected on the image translating screen of the image transmitting tube and thereby starting another image feed back cycle. As a result, an irregularly shaped momentary image of the transient, once captured by such feed back system, will bring about a succession of image feed back cycles which reproduce on the screen units, a succession of momentary images of the transient which constitute effectively and may be observed as an enduring persistent irregularly shaped image of the transient.

In a transient analyzer of the invention, utilizing such photo-electric image feed back system, an electronic trigger and switch control circuit is arranged to maintain the image feed back system in a standby condition and to operate automatically upon occurrence of a transient, to capture on one of the screens of the feed back circuit, or on an image screen of an auxiliary image tube, a momentary initial image corresponding to the transient. Furthermore, the control circuit of such transient analyzer of the invention is arranged to operate automatically after a time delay correlated to the procedure of producing the initial image of the transient and set into operation the feed back action of the photo-electric image feed back system for producing thereby a succession of corresponding momentary images of the transient which may be observed as an enduring persistent image of the transient.

The image reproducing tube device, which forms part of the photo-electric feed back system of such transient analyzer, may be utilized for impressing a momentary initial image of the transient into the photo-electric feed back system. The electronic control arrangement combined with such transient analyzer is arranged to maintain the image reproducing tube in a standby condition and to actuate it upon occurrence of a transient to start an initial operation in which it reproduces on its image screen a momentary image of the transient, the control arrangement operating automatically after a time delay correlated with the initial operation to recombine the image reproducing tube with the image translating tube into the photo-electric feed back system for producing therewith a succession of corresponding momentary images which may be observed as a persistent image of the transient.

Alternatively, another effectively identical image reproducing tube may be combined with the image reproducing tube of the photo-electric feed back system and their image screens are optically aligned so that the projections of identical images reproduced on their two image screens are projected on the image translating screen of the image transmitter tube so that the two identical projected images coincide thereon.

The electronic control arrangement is combined with such transient analyzer so that the feed back system is maintained in standby condition and causes the transient analyzer to operate automatically upon occurrence of a transient, to start an initial operation which impresses an initial momentary image of the transient on the image screen of the additional image reproducing tube which is projected therefrom on the image translating screen of the image transmitter tube, the control circuit operating automatically after a time delay correlated with the initial operation, to set into operation the feed back action of the system, so that as the initial image of the transient is projected on the screen of the image transmitter tube, it starts sending an initial sequence of image reproducing signals to the image reproducing tube, forming part of the photo-electric feed back system, thereby starting its feed back action which provides an observable enduring image of the transient.

The present invention is not concerned with the details of the electronic switching circuits, nor with the details of the operating circuits and structures of the television receiver tubes and television transmitter tubes used therein. Accordingly, in order to simplify the explanation of the principles of the invention, an exemplification thereof will now be described by reference to the simplified block diagram in which the various elements of the system which are symmetrically indicated by block elements and interconnected circuit lines representative of the general arrangement of the circuits of the system.

Referring to the simplified diagram of Fig. 1—A, there is shown an electro-responsive image reproducing means 11, indicated in the form of a conventional cathode ray television device having an image reproducing screen 12, a photo-electric image translating means 13, indicated in the form of a standard television image transmitter device having a photo-electric image translating screen 14 which are combined with image projecting means generally designated 15, and indicated by a lens 16 and a semitransparent mirror 17, which are shown arranged to project a momentary image appearing on the image reproducing screen 12 of the image reproducing device 11 on the image translating screen 14, of the image translating device 13.

The image reproducing device 11 may be a cathode ray projection tube of the type used for receiving television images. Such tube usually has beam control electrodes for controlling the intensity of the beam of electrons directed on the fluorescent image screen 12, and sets of sweep electrodes which are connected to a source of electric sweep signals so as to scan the area of the image screen 12 along closely adjacent parallel lines at a certain number of frames per second.

The image translating device 13 may be a standard television image transmitter tube, such as an iconoscope. Such tube usually has photo-electric mosaic screen 14 and a set of sweep electrodes are connected to a source of sweep signals which control the scanning action of an electron beam and cause it to scan the area of the screen 14 along closely adjacent parallel lines at a certain number of frames per second. The image translating or transmitting tube 13 operates in the well known manner so that when a momentary image is projected on its image translating screen 14, the tube will deliver a sequence of image reproducing signals corresponding to the momentary image projected thereon.

In Fig. 1—A, the terminal ends of the tube structures 11 and 13 are shown interconnected through sweep circuit line sections 21, and switch means 22 to a common source of electric sweep frequency signals 23, in such manner that when the screen electrodes of the two tubes are interconnected to the sweep signal source 23, the electron beams of the two tubes 11 and 13 will scan their respective screens 12 and 14 in substantially perfect synchronism.

The electric output end of the image translating tube 13 which delivers the image reproducing signals is connected through electric feed back circuits or feed back line 30, generally designated 30, including an amplifier 31 and an output lead 32 connecting the output amplifier to the input sides of the beam control electrodes of the image tube 11, so that the two tube structures 11 and 13 with the image projection means 15 form together with a feed back system which causes a momentary image projected on the image translating screen 14 of tube structure 13, to produce therein a sequence of image reproducing signals which are impressed through the feed back circuit 30 on the input side of the image reproducing tube 11 for reproducing on its screen 12, a similar momentary image which in turn is projected by the projection means 15 on the image translating screen 14 of the image translating tube 13, with the result that a succession of similar feed back cycles produces a succession of identical momentary images which may be observed as a persisting enduring image, although the original image which started the image feed back action, was only of a momentary transient nature.

Fig. 1—A also shows an additional image reproducing device 11—1 with an image screen 12—1, similar to tube 11 and arranged so that an image produced on screen 12—1 will be projected by the projection system 15 on the image translating screen 14 of translating tube 13. The conventional sweep control electrodes of the additional image reproducing tube 11—1 are shown connected through a sweep circuit line 24 including a switch 25 to the common source of sweep frequency signals 23 so that the electron beam of image reproducing device 11—1, scans its screen 12—1 in the same manner and in perfect synchronism with the manner in which screens 14 and 12 are scanned by the beams of their respective tubes 13 and 11. The additional image reproducing tube 11—1 is also shown connected through an input circuit 41, including an amplifier 42 to a circuit line 44, through which an electric transient of a momentary event may be impressed on tube 11—1, so that upon occurrence of a transient, the electron beam of tube 11—1 will trace on its image screen 12—1 a momentary image of the transient.

The several tube structures are so arranged that the image appearing on image screen 12 of tube 11, is optically aligned by the projecting system 15, with the momentary image which appeared on image 12—1, so that a momentary image appearing either on screen 12—1 or screen 12 will be projected on the screen 14.

Let us now assume upon occurrence of a transient, the operation of the image reproducing tube 11—1 has produced on its image screen 12—1, a momentary image of the transient. As soon as the momentary image of the transient appears on the image screen 12—1, the momentary image appearing on screen 12—1 will be projected by the projecting system 15 on the photo-electric image translating screen 14 of the transmitter tube 13. Because of the action of the amplifier modulator 31 of the feed back circuit 30, which interconnects the tubes 13 and 11, and of the synchronized scanning actions of the beams of the two tubes 13, 11, a corresponding luminescent momentary image will be produced on the image screen 12 of tube 11 which is in turn fed back and projected on the image translating screen 14 of tube 13.

The appearance of each discreet image element on the screen 12 of tube 11 will be delayed until the beam of the image transmitter tube 13 reaches the corresponding illuminated mosaic element of the image translating screen 14. During the intervening time, which may be anything between zero and one frame interval, the image signal is stored by the persistence of the screens of the image screen 12—1, of the image tube 11—1, and of the persistence of the mosaic screen 14 of the picture translating tube 13.

The momentary image produced on image screen 12, by the feed back action of the image signals impressed by tube 13 on tube 11, will again be projected by the projecting system 15, on the image translating screen 14, of transmitter tube 12, and this image feed back action will repeat itself during every frame interval or full scanning cycle of the beam scanning process, with the result that a quasi-stationary substantially persistent enduring image of the momentary original image, will appear on the image screen 12 of tube 11.

In other words, the system shown in Fig 1—A is so designed that a momentary transient image, originally reproduced on image screen 12—1, will set into operation of feed back action which will produce on image screen 12 of tube 11 a quasi-stationary image which is a duplicate of the momentary transient image which appeared on the image screen 12—1 of tube 11—1. Tube 11—1 merely initiates the feed back action which is carried on by the feed back system formed by the two tubes 11 and 13 in combination with their electric feed back circuit interconnection 30, and their image projecting feed back means 15.

In order to exclude extraneous or disturbing stray light from the space regions of the image feed back system in which the images are reproduced and projected from one screen element to another screen element thereof, there is indicated a screen vessel structure 46 which forms a light screen enclosing all such spaces and excluding therefrom stray light. The light screen structure 46 is shown provided with a window 47 through which an image formed on one of the screen elements of the feed back system may be observed, for instance, as shown, the image formed on screen 12 of the image reproducing tube 11. Instead of providing such window, the momentary images which are cyclically fed back by the image feed back system, may be reproduced on an auxiliary image reproducing tube 11—2, generally similar to the image reproducing tubes 11, 11—1 and shown connected through circuit line portions 32—1, 23—1 and parallel to the output leads from the feed back amplifier 31 and the sweep signal source 22, so that a succession of images reproduced by the image feed back system is also reproduced on the screen of the auxiliary cathode ray tube 11—2 where it may be conveniently observed and studied while the image feed back action is carried on by the image feed back system.

According to a phase of the invention, the structure of the two tubes 11 and 13 of image feed back systems of the type described above, is combined into a single unitary tube vessel structure in which all the beam producing and controlling elements and all screen elements of the two tubes are properly arranged and operated. The light excluding vessel structure 46, which encloses the space in which all the principal elements of the several tubes are located, indicates such unitary tube vessel structure in which the principal element of all three tube structures 11, 11—1 and 13 of a system are combined into a unitary tube structure.

The elements of the image feed back system have to be so designed as to avoid astigmatism and to assure that the scanning directions of the electron beams of the two tube structures 11 and 13 are in perfect alignment to avoid the rotational displacement of the reproduced image pattern. The synchronization of the electron beams of the tube structures 11, 13 of the image feed back system must be made exceedingly positive to prevent blurring or drifting of the image pattern.

The electron beams of the two tube structures 11 and 13 must scan their respective screens with the same number of lines and with the same aspect ratio. Thus, in a concrete case, the vertical sweep electrodes may be supplied with a saw-tooth wave of a frequency of 30 cycles per second and the horizontal sweep electrodes with a saw-tooth wave frequency of 12,000 cycles per second. This means that the screens are scanned 400 times in the horizontal direction while being scanned once in vertical direction. With such arrangement, the scanning beam moves on the screens along 400 parallel lines, creating what is known in the television art as a 400 line picture with a 30 cycle frame frequency without interlacing.

If the deflection sensitivity of the transmitter tube 13 is so adjusted that the scanned area has a width to height ratio or aspect ratio of 4 to 3, then the picture reproducing tube must be adjusted to operate with the same aspect ratio. Furthermore, the projection system 15, must be so designed and focused that the image of the scanned screen area of the tube structure 11, coincides exactly with the image of scanned screen area of the transmitter tube 13. The same considerations apply to the cooperative relation of the auxiliary tube 11—1 when it is used for injecting a momentary initial picture of the transient into the image feed back system.

When the mosiac screen 14 of the image transmitter tube 13 is scanned by the electron beam, each granular element of the mosiac scanned, is substantially instantaneously charged when it is hit by the electron beam as it passes thereover in the course of the scanning cycle. The charged screen element will discharge to an appreciable extent only if an image element is projected thereon during the remainder of the frame period.

Accordingly, when the electron beam passes a particular point element of the mosiac 14, a pulse of current will flow, if that particular point has been illuminated during the preceding frame interval. In other words, the transmitter tube provides electric signals which fluctuate in accordance with the illumination to which the mosiac 14 was subjected by an image projected thereon, during a previous frame interval.

Assuming that the image feed back system is in its operative condition and that a latent image, for instance, in the form of a circle projected on the mosaic 14, has just been scanned by the electron beam. As a new frame interval starts, the beam will scan, first, the upper portions of the mosaic 14, where no latent image exists and the transmitter tube 13 will therefore send out no signal. Since the transmitter tube 13 sends out no signal to the beam electrodes of the image reproducing tube 11, its electron beam will receive zero beam current and its synchronously operating electron beam will be therefore merely virtual and non-existent, and hence creates no luminous trace on its fluorescent screen 12. This condition will persist during that part of the frame interval during which the beam of the transmitter tube 13 was scanning the part of the mosaic 14 on which no latent image exists. As the beam of the image transmitter tube reaches, for the first time, the region of the latent image which was projected thereon, a signal will be transmitted through beam signal feed back circuits 30, 31, 32 to the image receiver tube 11, causing its electron beam to carry the electrons which illuminate a corresponding point element of its fluorescent screen 12. The luminous condition of the screen 12 will itself persist for some fraction of time due to the natural persistence of its screen material and will be projected by the image projecting system on the mosaic screen 14 of the transmitter tube, thereby recreating on the mosaic the latent image just previously erased by its own electron beam. This entire sequence of operations repeats itself every 30th of a second thereby causing the original image to be apparently continuously visible on the screen of image reproducing tube 11, due to the natural retentivity of the eye. As a result, a latent image once created on the mosaic screen 14 of the transmitter tube 13 will persist in spite of its periodic erasure by its electron beam and it will also persist in the form of a luminous image on the fluorescent screen of image receiver tube 11.

Fig. 1 indicates diagrammatically the general mode of operation of an electronic trigger and switch control arrangement of a transient analyzer utilizing an image retaining system of the type shown in Fig. 1—A. The electronic trigger element 51, which may form part of the amplifier 42 shown connected thereto, is arranged to provide in a conventional electronic trigger and time delay actions by means of which the operation of the electronic switches establish in proper sequence the operating circuits for the several elements of the transient analyzer shown in Fig. 1—A.

The switch unit 22, which controls the interconnections of the sweep signal source 23 to the sweep electrodes of the two tubes 11, 13 of the feed back circuit is shown connected to the trigger element 51 through control circuits represented by control line 51—1. The electronic switch 25 which completes the connections of the sweep signal source 23 to the sweep electrodes of the auxiliary tube 11—1 and the electronic switch 43 which completes the circuits through which the signal of a transient is impressed upon the beam electrodes of the image tube 11—1, are shown connected to the trigger element 51 by a common control line 51—2.

With an arrangement of the general type indicated in Fig. 1, the several trigger and switch elements shown may be designed to operate as follows: Under normal standby conditions, and in the absence of a transient, switch 22 keeps disconnected the sweep control circuits of the image reproducing tube 11 and image transmitter tube 13 of the image feed back system. Switch 25 keeps disconnected the sweep signal source 23 from the sweep electrodes of the auxiliary tube 11—1, while switch 43 keeps open the beam control circuits through which the amplifier 42 impresses on the auxiliary tube 11—1 the amplified transient signal from line 44. Upon occurrence of a transient, on the circuits of line 44, the amplifier 42 sets into operation the trigger circuit element 51 which operates to actuate the switch units 25 and 43 for completing the circuits to the sweep and beam electrodes of the auxiliary image reproducing tube 11—1, so that an image corresponding to the transient signal impressed on amplifier 42 may be reproduced on image screen 12—1 as a momentary initial image of the transient.

In addition, after a time delay correlated to the time during which the momentary initial image is reproduced on the screen 12—1, of the image reproducing tube 11—1, the trigger element 51 operates to cause switch 22 to complete the sweep circuits for the image reproducing tube 11 and the image transmitting tube 13 of the image feed back circuit, and to start the initial feed back cycle of their feed back action, whereby the momentary initial image produced on image screen 12—1, on being projected on the image translating screen 14 of the image transmitting tube 13, produces therein a sequence of image reproducing signals which are impressed on image reproducing tube 11 for reproducing on its screen 12 an image identical with the initial image produced on image screen 12—1 and which is in turn projected by the image projecting system 15 on the image translating screen 14 of the image transmitting tube 13. The initial feed back cycle starts a succession of feed back cycles of the system which reproduce a succession of momentary images of the transient, which are substantially identical facsimile of the initial image injected into the feed back system by the screen 12—1 of the auxiliary tube 11—1.

Fig. 1 also indicates an alternative type of switch control, which makes it possible to utilize the image transmitter tube 11, which forms part of the image feed back circuit for automatically injecting the momentary initial image of the transient into the feed back system and thereafter establishing the operation of the image feed back system. An electronic switch 45 is shown placed in the circuit line 32, through which the amplifier 31 impresses amplified feed back signals on the beam electrodes of tube 11 which controls the completion of the circuits from amplifier 31.

There is also indicated, in dotted lines, an additional output line 41—1 including an electronic switch 43—1 through which the initial transient signal from circuit line 44 may be impressed by the transient amplifier 42 on the electronic electrodes of tube 11. The operation of the two switches 45, 43—1 is controlled by trigger element 51 through circuits indicated by circuit lines 51—3, 51—4, respectively.

Assuming that the auxiliary tube 11—1, with the switches 25, 43 are not present, and that the transient analyzer embodies only tubes 11 and 13, it may be arranged to operate as follows: In the absence of a transient, switch 22 keeps open the sweep signal circuits leading to the two tubes 11 and 13, while switch 53—1 keeps open the feed back circuit connections to the beam electrodes of image reproducing tube 11. Upon occurrence of a transient, the amplifier 42, upon which the transient is impressed, sets into operation the trigger element 51 which in turn operates the switch element 43—1 to complete the circuit through which the amplifier 42 impresses a signal corresponding to the transient, on the electrodes of image reproducing tube 11, while the trigger element 51 simultaneously actuates switch 22 to connect the sweep electrodes of tube 11 to the sweep signal source 23, so that a momentary initial image of the transient is reproduced on image screen 12 of the tube 11.

In addition, after time delays correlated to the time during which the momentary initial image of the transient is reproduced on screen 12 of tube 11, the trigger element actuates switches 43—1 and 45 to open the circuit connections of transient amplifier line 41—1 to tube 11 and to complete instead, the feed back circuit through line 32 and amplifier 31 between the two tubes 11 and 13, while at the same time switch 22 is actuated to complete the sweep signal circuits to the two tubes 11 and 13, thereby starting the image feed back action between the two tubes 11, 13, so that as soon as a momentary initial image of the transient appears on screen 12 of the image reproducing tube 11, of feed back circuit interconnections and operating circuits of the two tubes 11, 13 are completed for producing a succession of momentary images which are identical with the momentary image initially reproduced on image screen 12. If tube 11 is used for capturing the initial element of the transient and thereafter interconnected into the image feed back system, it may be placed in a position which is shown occupied by tube 11—1, in which case, the image projecting system may be simplified by omitting elements represented by the transparent mirror 11. Such transient analyzer arrangement, using only two tube structures such as tubes 11, 13, may be used whenever the duration of the transient is shorter than the screen persistence of the image screens, which makes it possible to capture the initial image of the transient on screen 12 of image tube structure 11, and then interconnecting it into the image feed back system within the time period of the screen persistence so as to start a succession of image feed back cycles which provides an identical persistent image of the transient in the manner explained above.

In accordance with the invention the following principles are followed in designing a transient analyzer.

Since, in most cases, an image of a transient which is to be studied has to have merely the shape of a line curve, the image of such has to appear on the screens of the transient analyzer only in the form of a contrasting curve, for instance, a black and white curve. The duration of the useful persistence of the screens of tubes 11, 13, forming part of the image feed back system is made at least equal to one scanning frame interval, in order to utilize the full benefit of light storing properties of the screens' elements.

Similar considerations apply also to the image screen of tube 11—1 when used to inject the initial momentary image of the transient into the image feed back system. One difficulty normally encountered in the design of the usual television systems may be considerably reduced in the design of transient analyzers of this invention. This is due to the fact that, since the reproduced image of the transient is stationary, the required scanning frame frequency and consequently the entire frequency band may be made much narrower than in the usual television system. Accordingly, a band width reduction of the order of 3 to 4 octaves is feasible.

The image storing capacity of the screens perform the function of feed back signal storing means. When an auxiliary image reproducing tube 11—1 is used in a transient analyzer arrangement of the type shown in Fig. 1, its screen 12—1 should have sufficiently useful image persistence of the required brilliancy so that under all conditions each line element of its picture projected on the mosaic screen 14 of the image transmitter tube 13, will be picked up by its scanning beam during the frame interval of the scanning action. Alternatively, the mosaic screen 14 of the picture tube 13 may be provided with sufficient persistence for storing the luminescent image projected thereon for the period of the frame interval. Alternatively, the combined image storing capacity of the image screen 12—1 and the mosaic screen 14 may be utilized to assure that during the frame scanning interval, the scanning beam of the transmitter tube will scan each line element of the picture projected thereon by image screen 12—1.

The foregoing considerations also apply to the relationship of the image screen 12 to the image screen 14.

To the extent that the image areas of the screens 12 and 14, which form part of the image feed back system, are brought into coincidence by the image projection system 15, each elemental area of one screen must be scanned by the associated electron beam in space, direction and time synchronism.

For reasons explained hereinafter, good operating conditions will be assured if the feed back system is so designed that the feed back action causes the luminous image trace formed on the image screen 12 of the image reproducing tube 11 to be energized to maximum brilliancy.

According to the invention, the elements of the image feed back system of the type described above are designed in accordance with the principles set forth below, so as to assure stable operation of the system.

One of the factors governing the stability of image feed back systems of the invention involves the following considerations: Assuming that an image feed back system including tubes 11 and 13, is in a condition where the tubes are devoid of any image, it would be expected that this condition would persist. However, this is not the case. Suppose a microscopic disturbance creates on the mosaic screen 14 of the transmitter tube 13, an extremely feeble latent image. This feeble image will generate in tube 13 a feeble signal which is supplied through amplifier 31 to the image reproducing tube 11, which reproduces a corresponding feeble image on its screen 12. This would, in turn, recreate a latent image on screen 14 of the transmitter tube 13, stronger than the original image, and so on. Accordingly, in general, even an infinitely feeble image appearing in any part of the feedback system, would rapidly augment itself into a feeble image and the nature of such image would be entirely unpredictable.

If the output of the image reproducing signals desrived from transmitter tube 13 and amplified by amplifier 31 is too low as to produce a sufficiently bright image trace on image screen 12 of tube 11, the image will fade out. On the other hand, if the output of the image transmitter 13, is larger than required to produce on image screen 12 an image of a given brightness, the feed back action will continuously increase the output of transmitter tube 13, and this process will continue until some element of the feed back system saturates.

Between the two conditions, just considered, there is a condition of unstable equilibrium which is a condition at which the output of the image transmitter tube 13 is just sufficient to produce on image screen 12 of the image reproducing tube 11, an image of a brilliance which is just sufficient to maintain such output of the transmitter tube 13. According to the invention, these difficulties are overcome by proper adjustment of one or more of the elements of the image feed back systems, so as to assure that the effective feed back action does not set in unless at least one element of the system operates with a signal level greater than a predetermined minimum threshold, and by causing at least on element of the feed back system to operate at a saturation level when the feedback action takes place.

Since, in a transient analyzer, all the luminous parts of the image may be reproduced with a uniform contrast such as black and white, stability of the system may be assured by designing it so that when the feed back action sets in, the system operates with a gain which causes the system to saturate, for instance, by saturating one element thereof, for instance, the image screen, so that the image trace produced thereon by the feed back action has the maximum conditions of brilliance or contrast.

This may be explained by reference to the curve diagram of Fig. 2, in which, curve 61 indicates, as a function of time, the level of the signals in one of the elements of the feed back system, for instance, the level of the signals delivered by transmitter tube 13 and impressed through the feed back circuit elements 30, 31, 32 on the beam electrodes of image reproducing tube 11. In accordance with the invention, at least one element of the feed back system, such as the amplifier 31, is so designed that as long as the level of the signals delivered by the transmitter tube 13 is below a minimum threshold level, indicated by line 62, no beam signal will be impressed by the amplifier 31 on the image reproducing tube 11, and to cause it to transmit amplified signals only if the signal level of the currents delivered by transmitter tube 13 are greater than the threshold level 62. Instead of designing the amplifier 31 to prevent the transmission of beam circuit signals from transmitter tube 13 to transmitter tube 11, unless their level exceeds the threshold level 62, another element of the feed back system, for instance, the screen element 12 of image reproducing tube 11 may be designed so as to not reproduce any image thereon unless the signal impressed thereon on its beam electrodes exceeds the threshold level indicated on 62 in Fig. 2.

In other words, the elements of the image feed back system are so adjusted that no luminous effect is produced on the screen of the image transmitting tube 13 or image reproducing tube 11, unless the beam signal supplied by the transmitter tube 13 exceeds a minimum threshold level. With such arrangement, random or accidental disturbance, such as stray light, shot effect, resistor noise, which tend to create disturbing signal outputs in the feed back system, as indicated in Fig. 2 by parts of curve 61 which are below the threshold level 62, will not produce a luminous image on the screen of image tube 11 or image transmitter tube 13 and will not start feed back action. However, if an image of sufficient light intensity is created on image 12 of image reproducing tube 11, or if such image of sufficient intensity is projected on screen 14, such sufficiently bright image will cause the image transmitter tube 13, to deliver signals of an intensity greater than the threshold level 62, as indicated in Fig. 2, by curve portion 64, so as to cause the amplifier 31 to impress on the beam electrodes of tube 11 a signal of sufficient level to create a corresponding bright image on the screen of tube 12 which will sustain the image feed back action.

Figure 2:
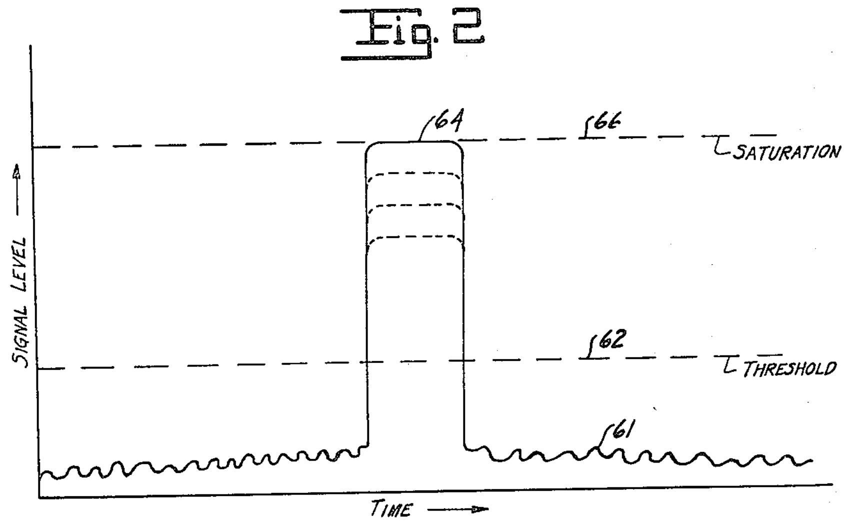
Fig. 2 is a curve diagram explaining certain features of the invention.

According to the invention, the image feed back system is so designed that when the feed back action is once started, it will increase until at least one element of the system has reached a condition of saturation, for instance, such as represented in Fig. 2, by the line of saturation level 66. This may be accomplished by designing the amplifier 31 so as to permit an increase in the amplified feed back signals impressed on tube 12, until the image of the signals reproduced on its screen has reached the maximum condition of brilliance or contrast.

Another factor governing the stability of the image feed back system of the invention involves the following consideration: If an image trace reproduced by the feed back action on the image screen 12 of tube 11 is not in space alignment with the previous image projected from screen 12 on screen 14 of the transmitter tube, there will be a tendency for the image trace to drift or creep so that sooner or later the image trace will be lost. In other words, assuming that in an initial feed back cycle, a first image spot projected on the mosaic screen 14 of the transmitter tube 13, causes it to feed back to the image tube 11 a signal which creates thereon on its screen 12 a corresponding luminous spot which on being projected by the image projection system 15 on the mosaic screen 14 of transmitter tube 13, as a second luminous spot which does not coincide precisely with the first image spot. In the second similar feed back cycle, the slightly displaced second luminous spot on the mosaic screen will result in projecting thereon a third luminous spot which is still more displaced or shifted from the first luminous spot projected thereon and this shift of the luminous spot will increase with each successive feed back cycle of the image feed back system. As a result, any misadjustment or misalignment of the transmitter image in the feed back action will cause the image to drift until it is lost.

According to the invention, this difficulty is overcome by subdividing at least one section of the image recreating region of the feed back system into a number of equal discrete image area elements sparated by inactive or opaque boundary regions of such widths as to prevent drifting of the image elements reproduced in sucessive cycles of the feed back action. This may be done, for instance, in the manner indicated in Fig. 3 by subdividing one of the screens, for instance, the mosaic screen 14, or the image reproducing screen 12, into areas of equal discrete screen elements 71, separated by inactive boundary regions 72 of inactive screen material. The width of the boundary regions should be less than the diameter of the electron beam which scans the screen and the dimensions of the active screen elements are so chosen, in relation to the scanning frame interval, that the maximum anticipated drift shall not shift the image spot beyond the boundary region of the active screen element, that such arrangement will freeze the image pattern in its position. Alternatively, a grid mask, similar in its effect to a wire screen, may be placed in front of the screen of the image reproducing tube 11, the opaque portions of the screens being sufficiently large in relation to the transparent portions thereof as to compensate for slight misalignment or drift of the electron beam.

Figure 3:
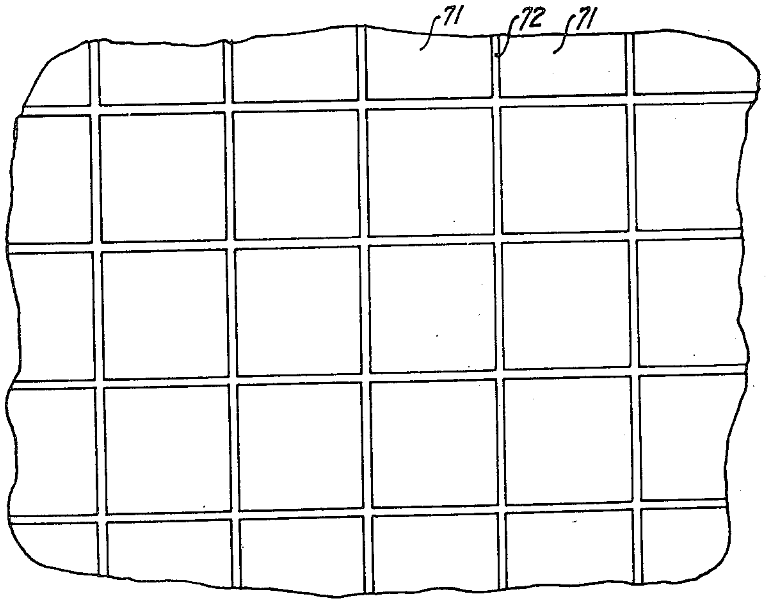
Fig. 3 is an enlarged diagrammatic view representative of the detailed structure of a screen forming an element of the feed back system of the type shown in Fig. 1—A.

The effect of such screen arrangements may be explained as follows: Suppose a first image spot on a screen, such as shown in Fig. 3, formed on a screen element 71, along the edge of the opaque boundary region 72, appears in the next feed back cycle slightly shifted into the opaque boundary region. Since the part of the second image spot which falls into the opaque boundary region 72 will not be effective in producing any feed back action, the tendency of the image spot to drift beyond the effective screen element 71 will be blocked off, and shifting of an image spot will be confined to the area of one screen mesh.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a transient retaining system for retaining a persistent image of a nonrecurrent momentary irregularly shaped image: photo-electric image translating means including a photo-electric translating screen for translating an irregularly shaped momentary image projected on said translating screen into a sequence of corresponding irregularly different electric image reproducing signals; electroresponsive image reproducing means including an image screen arranged to be actuated by a sequence of the image reproducing signals for producing on said image screen a corresponding momentary irregularly shaped image; image projecting means for projecting on said translating screen of said image translating means the image reproduced by said image screen of said image reproducing means said image reproducing means and said image translating means forming parts of a photo-electric feed back system which feeds successive sequences of the image reproducing signals back from said image translating means to said image reproducing means and causes said image reproducing means to reproduce a succession of corresponding momentary images which constitute a substantially persistent irregularly shaped image corresponding to said momentary image; at least one of said screen elements being formed of substantially uniformly distributed active particles of active ingredients which are effective in operating as part of the feed back system the individual active particles being separated by inactive separation regions of the screen of a width of the order of the width of the electron beam, the width of the active areas and the separation areas being of such dimensions as to prevent drifting of the reproduced image on the image screen.

2. In a transient retaining system for retaining a persistent image: a light responsive device for translating received light into electrical signals, an electroresponsive device responsive to said electrical signals for translating said electrical signals into light signals, and means for transmitting said light signals onto said light responsive device so as to produce a succession of similar light signals by feed back actions and means responsive to an occurrence of a transient for setting in operation the feed back action of said feed back system for cyclically reproducing the light signals corresponding to the transient.

3. In a system for visualizing transients; image translating means comprising a translating screen including a multitude of photosensitive elements for translating the luminous image of a transient projected onto said translating screen into corresponding electrical charges and for storing said charges, and a translating electron beam scanning said translating screen in a predetermined manner to release said charges in the form of corresponding electrical impulses; image reproducing means connected to the said image translating means and including a reproducing screen for changing the electrical impulses into visual signals on said reproducing screen, and a reproducing electron beam scanning said reproducing screen; synchronizing means connected to said image translating means and connected to said image reproducing means for synchronizing at the same rate the scanning of the translating electron beam with the scanning of the reproducing electron beam; the visual signals formed on the said reproducing screen being projected onto the said translating screen.

4. A system for visualizing transients as set forth in claim 3, further characterized by a second image reproducing means adapted to be connected to a source of electrical transient wave and including a second reproducing screen for changing the electrical transient wave into a luminous image on said second reproducing screen, the luminous image formed on said second reproducing screen being projected onto the said translating screen.

5. In a system for visualizing transients; image translating means comprising a translating screen including a multitude of sensitive elements for translating the image of a transient projected onto said translating screen into corresponding electrical charges and for storing said charges, and a translating electron beam scanning said translating screen in a predetermined manner; reproducing means electrically connected to said image translating means and including means for producing ray means capable of energizing sensitive elements and projecting said ray onto said sensitive elements, said reproducing means also including scanning means for causing said ray means to scan; synchronizing means connected to said image translating means and connected to said reproducing means for synchronizing at the same rate the scanning of the translating electron beam with the scanning of the ray means; and visual reproducing means electrically connected to said image translating means and including a reproducing screen, an electron beam, and scanning means for causing said electron beam to scan said screen in synchronism with the scanning of the said translating electron beam.

OTTO KORNEI.

REFERENCES CITED

The following references are of record in the file of this patent:

UNITED STATES PATENTS

| Number | Name | Date |
|---|---|---|
| 1,738,464 | Wade | Dec. 3, 1929 |
| 1,865,428 | Bethenod | July 5, 1932 |
| 1,894,637 | Scheibell | Jan. 17, 1933 |
| 1,985,683 | Nicolson | Dec. 25, 1934 |
| 2,006,812 | Nicolson | July 2, 1935 |
| 2,124,404 | Schroter | July 19, 1938 |
| 2,378,388 | Begun | June 19, 1945 |
| 2,389,991 | Mayle | Nov. 27, 1945 |
| 2,422,295 | Eaton | June 17, 1947 |
| 2,426,752 | Sceli | Sept. 2, 1947 |